Patented Mar. 14, 1939

2,150,191

UNITED STATES PATENT OFFICE 2,150,191

DISAZO DYES AND PROCESS OF MAKING SAME

Swanie Siguard Rossander, Wilmington, Del., assignor to E. I. du Pont de Nemours & Company, Wilmington, Del., a corporation of Delaware No Drawing. Application June 29, 1937,
Serial No. 150,960

8 Claims. (Cl. 8—46)

This invention relates to new disazo dyes, characterized by desirable shades of red or scarlet in direct dyeing, and by their substantivity to cotton and regenerated cellulose.

It is an object of this invention to provide azo dyes of red shades and being substantive to cotton and regenerated cellulose. It is a further object of this invention to provide azo dyes having the qualities aforementioned, and possessing further the adaptability of being developed on the fiber to produce orange to red to reddish brown colors of good washing fastness. Other objects of this invention will appear as the description proceeds.

The objects of my invention are attained by tetrazotizing aminobenzoyl-p-tolylene-diamine, and coupling it to two molecules of amino-benzoyl-J-acid.

I have found that the dyestuffs thus produced possess commercially desirable shades of red or scarlet; are substantive to cellulose, whether natural or regenerated; are further capable of development on the fiber, for instance with beta-naphthol or phenyl-methyl-pyrazolone; and when so developed produce very bright shades within the range of orange to red to reddish brown, of good fastness to washing. Furthermore, the dyeings thus produced have excellent discharge qualities.

I am aware of German Patent No. 221,433 which discloses various dyes related in structure to the aforementioned compound forming the subject matter of this invention. The nearest compounds of the German patent related to my invention are the one prepared from m'-aminobenzoyl-m-phenylene-diamine and the one from m'-aminobenzoyl-m-tolylene-diamine. However, the dyeings produced by these compounds are of different shades than those produced by the novel compounds of my invention. My novel dyestuffs, on the other hand, combine the properties of brightness with desirable shade, good washing fastness, good dischargeability and other valuable characteristics demanded in the textile dyeing art.

The novel dyestuffs of my invention correspond to the general formula

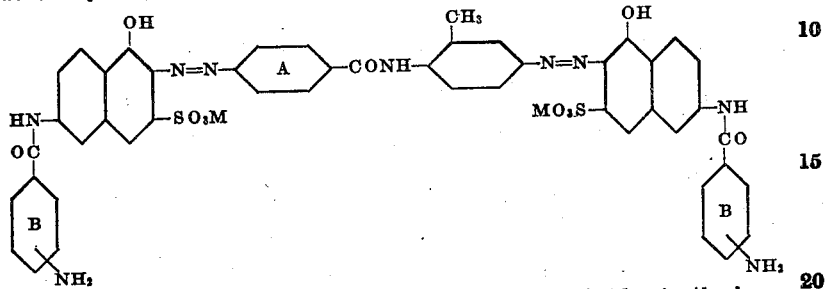

wherein the position of the azo bridge in the benzene ring marked A may be either meta or para, and the positions of the NH₂ groups in the benzene rings marked B, B may likewise be meta or para. The letter M in the above formula may represent hydrogen or an alkali-metal. As already stated, they may all be developed on the fiber by diazotizing and coupling to various developing components which have the property of rendering an azo dye water-insoluble.

The following table gives some of the dyes of this series actually prepared by me, together with their shades upon cotton both by direct dyeing and after development.

| | Direct shade | Developed shade when developed with— |
|---|---|---|
| MABPTD → [(MAB)-J-acid] 2 | Scarlet | Beta naphthol, scarlet. |
| MABPTD → [(PAB)-J-acid] 2 | ---do--- | Beta naphthol, red scarlet. |
| PABPTD → [(MAB)-J-acid] 2 | Red | Beta naphthol, red scarlet. |
| PABPTD → [(PAB)-J-acid] 2 | ---do--- | Beta naphthol, red scarlet. |
| Do | | 2:4-dihydroxy quinoline, orange. |
| Do | | Phenyl methyl pyrazolone, orange. |
| Do | | Aceto acetanilide, orange. |
| Do | | Metatolylene diamine, red brown. |

In the above table, MABPTD stands for meta-aminobenzoyl para-tolylene-diamine,

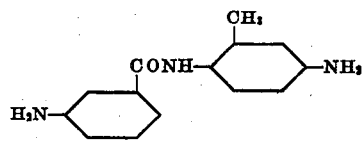

PABPTD stands for para-aminobenzoyl-para-tolylene-diamine,

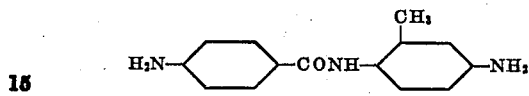

(MAB) stands for meta-aminobenzoyl and (PAB) stands for para-aminobenzoyl.

Without limiting my invention to any particular procedure, the following examples will illustrate my preferred mode of operation. Parts mentioned are by weight.

*Example I.—Preparation of MABJ-acid←MABPTD→MABJ-acid*

Slurry 48.2 parts of meta'-aminobenzoyl-para-tolylene-diamine with 2000 parts of water. Add 36.5 parts of hydrochloric acid. Ice to 5° C. Add 27.6 parts of sodium nitrite as a 30% solution, as rapidly as absorbed. Maintain a distinct excess of nitrite and Congo acidity for 25 minutes.

Charge 161 parts of m'-aminobenzoyl-J-acid in a tub with 1500 parts of water. Add approximately 8.5 parts of ammonia, leaving the solution clear and slightly alkaline to Brilliant Yellow paper. Add 8.4 parts of sodium bicarbonate and 117 parts of sodium carbonate. Ice to 5° C.

Slowly add the tetrazo compound above produced to the alkaline solution of m'-aminobenzoyl-J-acid. Continue stirring for 2 hours. Slowly warm to 80° C. Slowly add 5% salt by weight of the aqueous mass, and filter. Dry the press-cake in an oven at 80°–90° C. The dry powder thus obtained is reddish in appearance, and has most probably the constitution represented by the following formula:

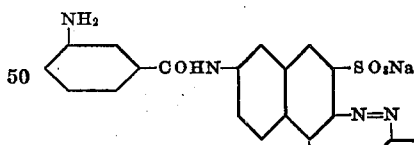

The above dye may be applied to cotton or regenerated cellulose by the direct method, and may be developed into a washing-resistant color on the fiber by tetrazotizing on the fiber and coupling to one of the customary developing components. The following additional example illustrates this procedure.

*Example II.—Dyeing of cellulosic fiber*

One part of cotton piece goods is dyed in the usual manner for colors of this series (see for instance the German patent above cited) with four-hundredths parts of the color prepared in Example I. The dyed fabric is rinsed in cold water and put in 400 parts of water at 20° C. Add six-tenths parts of sodium nitrite and eight-tenths parts of sulfuric acid. Stir 15 minutes. Rinse with cold water. Dissolve two-tenths of beta-naphthol in 400 parts of water and one-tenth part of caustic soda. Stir the solution rapidly while adding the above rinsed piece goods. Stir 15 minutes. Rinse in cold water and dry. The dyeing is a bright scarlet shade. The probable formula of the dye on the fiber is

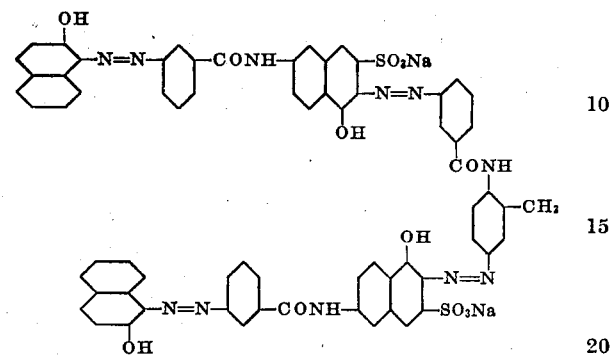

*Example III.—Preparation of MABJ-acid←PABPTD→MABJ-acid*

The procedure is the same as in Example I, except that in lieu of 48.2 parts of meta'-aminobenzoyl-para-tolylene-diamine an equal weight of para'-aminobenzoyl-para-tolylene-diamine is employed. The dyestuff has similar properties to that of Example I, and when developed upon cotton fiber according to the procedure indicated in Example II, it gives a bright red shade.

It will be understood that my procedure is not limited to the details set forth in the above examples, but may be varied widely within the skill of those familiar with this art. For instance, instead of isolating the color of Example I in the form of Na-salt, it may be isolated in the form of any other alkali-metal salt, or in the form of free acid. In the last mentioned case, the salting-out step is omitted, and in lieu thereof the aqueous alkaline mass, after the coupling step, is acidified by the aid of hydrochloric acid or any other suitable acid, until acid to Congo red, and the precipitated dye is filtered off, washed and dried.

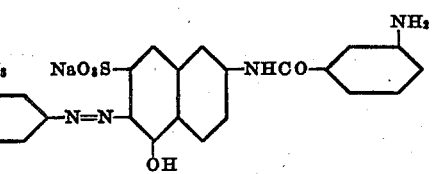

Likewise, instead of synthesizing the dyestuff by coupling tetrazotized m'- or p'-amino-benzoyl-p-tolylene-diamine to two mols of m'- or p'-aminobenzoyl-J-acid, the tetrazo compound may be coupled first to two mols of J-acid, and the disazo compound thus obtained may then be condensed in known manner with two mols of m- or p-nitro-benzoyl-chloride, followed by selective reduction of the nitro groups to the amino stage. (The details of such alternative procedure are per se known to those skilled in the art. See for instance, U. S. Patents Nos. 1,735,924 and 1,739,031 to Hitch et al.)

As developing components, beta-naphthol, 1-phenyl-3-methyl-5-pyrazoline, 2,3-hydroxy-naphthoic acid, m-tolylene-diamine, or any other developing component which has the property of producing a water-insoluble azo dye, may be employed.

If a water-insoluble pigment in substance is desired, the second tetrazotization and development may be done on the product of Example I in substance, and the resulting color recovered in substance, in the usual manner.

Many other variations and modifications will be readily apparent to those skilled in the art.

The dyes of this invention are characterized by bright shades and good substantivity to cotton; and after development on the fiber, for instance with beta-naphthol, they give dyeings which are very fast to washing and possess very good discharge qualities.

I claim:

1. A disazo dyestuff having a structure corresponding, when in the form of alkali-metal salt, to the formula

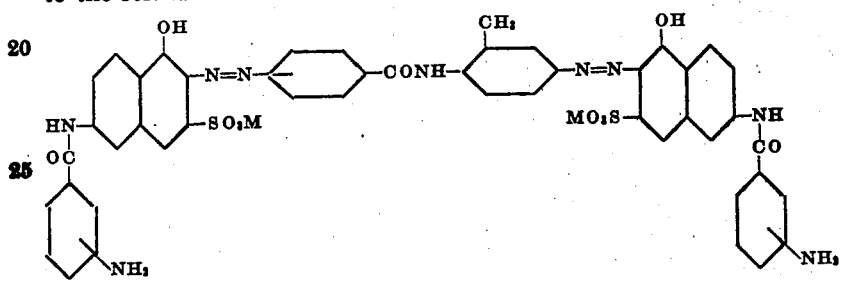

wherein M is an alkali metal.

2. The process of producing a disazo dye which comprises tetrazotizing an aminobenzoyl-p-tolylene-diamine and coupling it to two mols of an aminobenzoyl-J-acid.

3. A tetrakisazo dye having a structure corresponding, when in the form of an alkali-metal salt, to the general formula

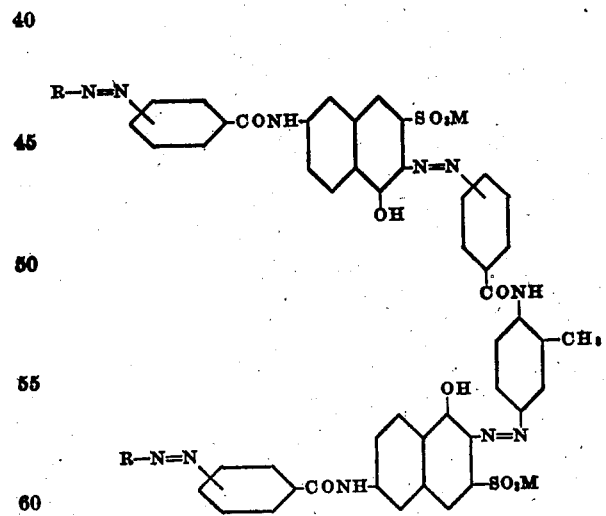

wherein R is a water-insolubilizing azo dye developing component, while M stands for an alkali metal.

4. A tetrakisazo dye having a structure corresponding, when in the form of its Na-salt, to the formula

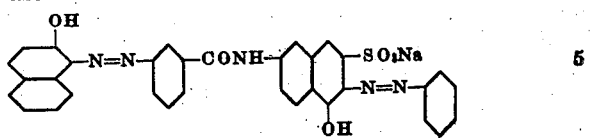

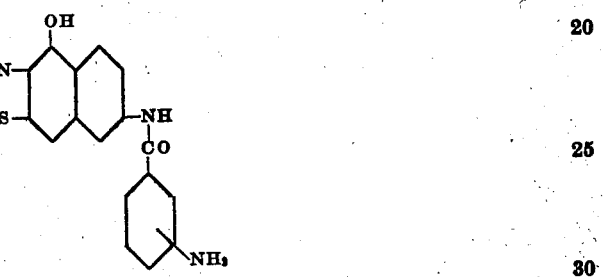

5. A tetrakisazo dye having a structure corresponding, when in the form of its Na-salt, to the formula

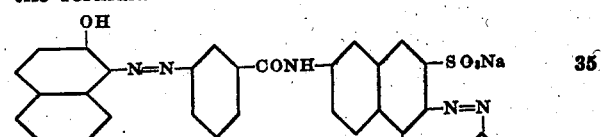

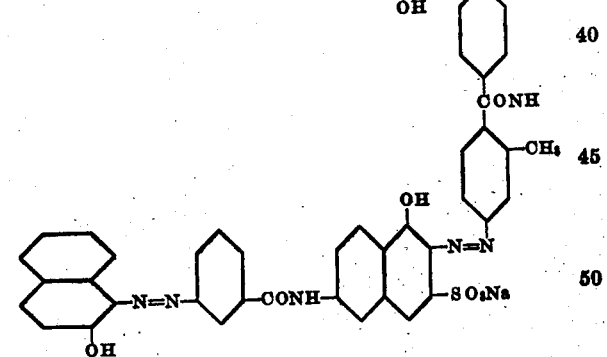

6. In the process of dyeing cellulosic material, the step which comprises applying thereto an aqueous solution of a dyestuff compound as defined in claim 1.

7. The process of dyeing cellulosic material, which comprises applying thereto an aqueous solution of a dyestuff as defined in claim 1, then tetrazotizing the dyestuff on the fiber and coupling it with a water-insolubilizing azo-dye-developing component.

8. The process of dyeing cellulosic material, which comprises applying thereto an aqueous solution of a dyestuff as defined in claim 1, then tetrazotizing the dyestuff on the fiber and coupling it to beta-naphthol.

SWANIE SIGUARD ROSSANDER.